Jan. 15, 1963    M. G. YUTER    3,073,944
HELICALLY FORMED TUBING WELDING AND CUTTING SAME INTO SECTIONS
Filed March 28, 1961    2 Sheets-Sheet 1
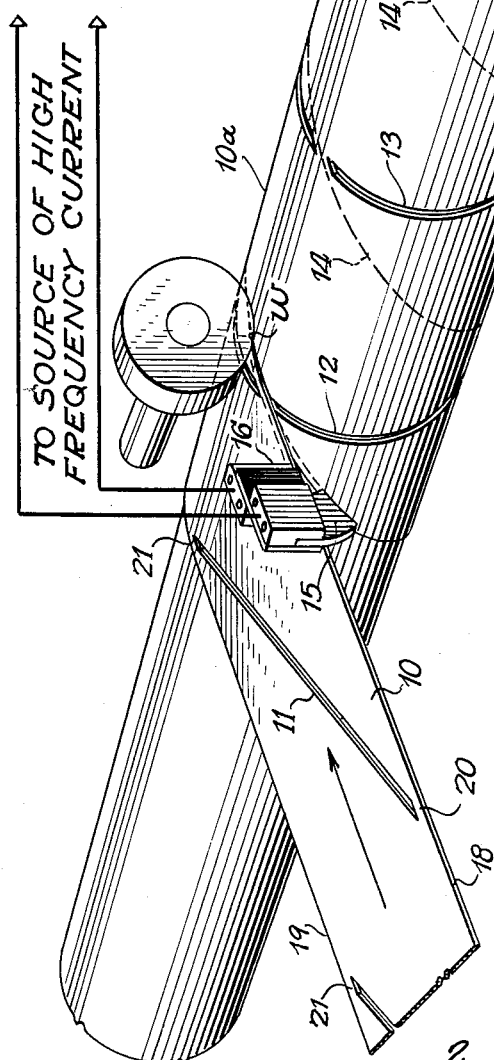
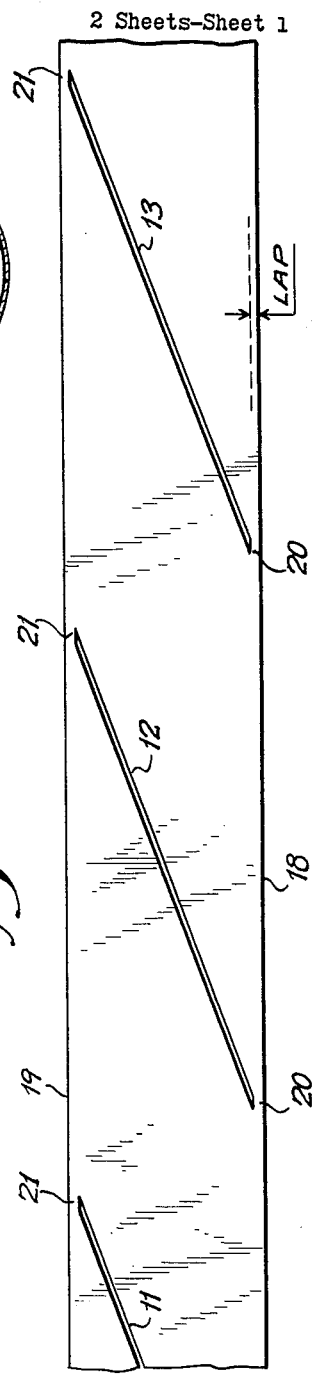
INVENTOR.
MORTON G. YUTER

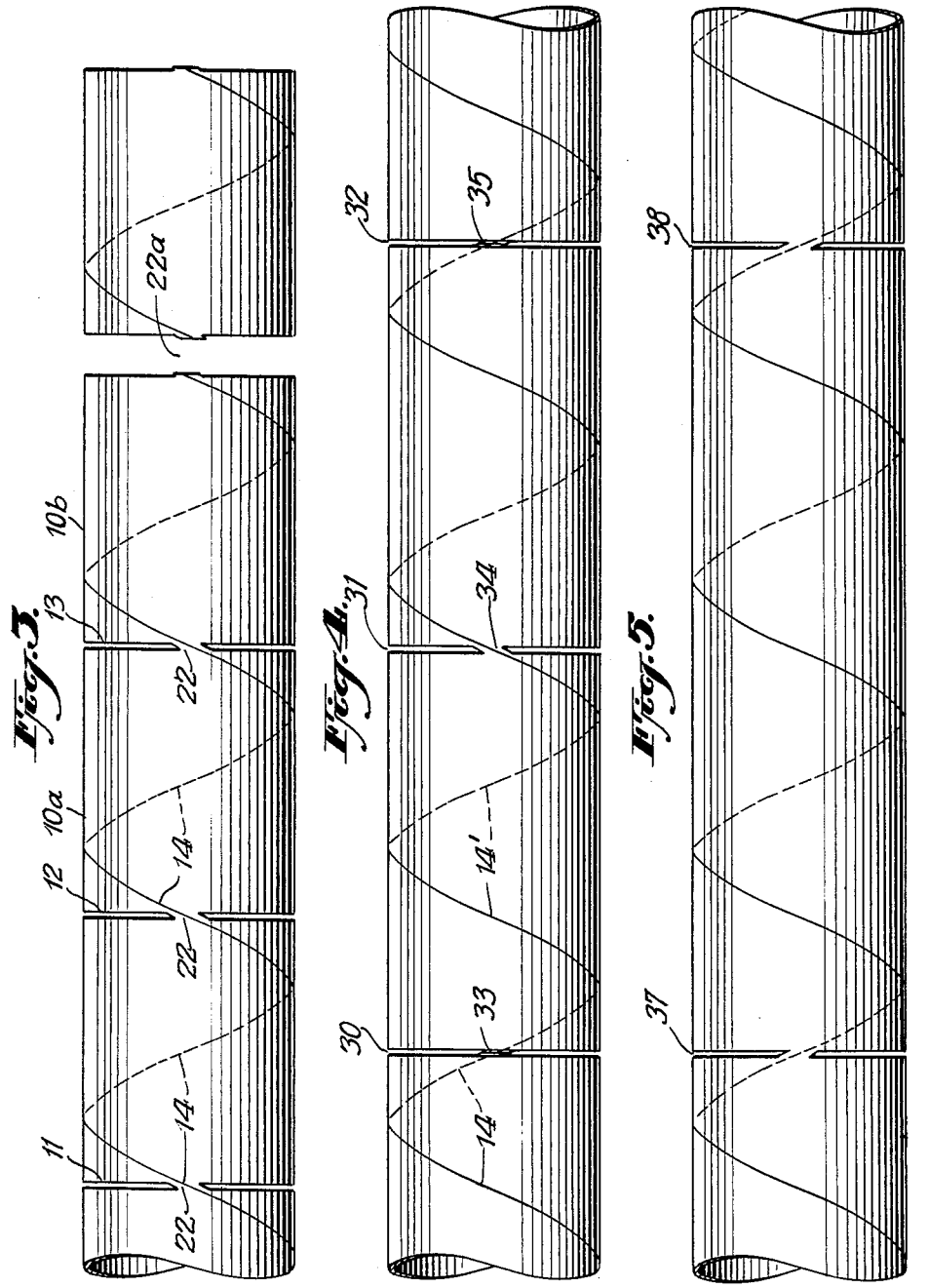

United States Patent Office 3,073,944
Patented Jan. 15, 1963

3,073,944
HELICALLY FORMED TUBING WELDING AND
CUTTING SAME INTO SECTIONS
Morton G. Yufer, East Rockaway, N.Y., assignor, by
mesne assignments, to American Machine & Foundry
Company, New York, N.Y., a corporation of New
Jersey
Filed Mar. 28, 1961, Ser. No. 98,813
3 Claims. (Cl. 219—62)

This invention relates to methods for making helically formed welded tubing and the separation of such tubing into sections of predetermined lengths.

In the U.S. patent to Rudd 2,873,353, granted February 10, 1959, a method is disclosed for forming metal tubing by helically winding a metal ribbon to form successive convolutions joined together at their edges by a helical welded seam, the welding being accomplished by heating such edges by high frequency current applied thereto in advance of the point of welding. The welded seam may be either butt welded or lap welded. If the tubing after being formed by this method, is to be cut into successive sections of finite length, the problem of doing so efficiently and rapidly presents serious problems particularly if the tubing is of relatively thin sheet metal, and thus easily collapsible or subject to distortion when cutting the same into lengths; for example lengths such as may be used for forming cans adapted for packaging comestibles, oils or other liquids or materials.

The present invention provides a method for so forming such tubing that as it emerges from the welding apparatus it will be slit transversely into predetermined lengths as desired except that the slits will not extend circumferentially entirely about the tubing but one or more small connecting portions will remain so that the tubing may be readily conveyed away as a series of connected sections which can readily be cut apart at the small remaining interconnecting portions, in suitable known ways at a later station.

In accordance with the present invention, the metal ribbon, before it reaches the welding apparatus and is helically wound into the shape of tubing, is passed through suitable apparatus for cutting therein a series of spaced apart slits extending diagonally across the width of the ribbon except that a narrow unslit portion or portions are left, preferably at each edge of the ribbon. In case the tube sections as finally desired are to have end edge portions located in a plane perpendicular to the axis of the tubing as is usually desired, then the slits as precut in the ribbon are cut along an angle to the edges of the ribbon equal to the helix angle at which the ribbon is to be welded in forming the tubing. For example in a typical case, such a helix angle may be about 18.5° in which event the slits formed in the sheet metal ribbon approaching the welding apparatus would be cut at that angle with respect to the edges of the ribbon. Thus when the ribbon is wound into place to form the tubing, the slits will then assume positions in planes perpendicular to the axis of the formed tubing. The distance between the slits, as referred to herein, is the distance measured along a line extending between adjacent slits and perpendicular thereto.

In any case, since the slits as cut in the ribbon ordinarily do not go so far as to intersect the edges of the ribbon, such edges may be welded together to form a welded seam either of the butt welded or lap welded type which in the finished tubing will pass helically around the tubing and the welded seam furthermore will pass through the narrow or small interconnecting portions of the tubing which remain unslit.

Such narrow unslit portions may all be in alignment on one side of the finished tubing where the end edge portions lie in parallel planes if the perpendicular distance between the slits in the ribbon is equal to $n \tan \theta \pi D$ where $n$ is a positive integer, $\theta$ is the helix angle and $D$ is the diameter of the tube. But, if desired, the small unslit portions may be located at angularly displaced positions around the tubing by making the slits at varying distances apart.

It may be desired to make the narrow unslit portions on opposite sides of the tube. In this case, the slits in the ribbon extend diagonally across the width of the ribbon except that a narrow unslit portion is left in the center and at each edge of the ribbon.

In another example, it may be desired to have each succeeding narrow unslit portion of the tube on opposite sides of the tube. This can be accomplished by spacing the diagonal slits in the ribbon at evenly spaced intervals, so as to produce tube sections of equal length, where the perpendicular distance between each slit equals $$\frac{n \tan \theta \pi D}{2}$$

where $n$ is any positive odd integer.

Various further and more specific objects, features and advantages of the invention will appear in the description below taken in connection with the accompanying drawings illustrating by way of example preferred forms of the invention.

In the drawings:

FIG. 1 is a somewhat schematic perspective view illustrating a preferred embodiment of the invention;

FIG. 2 is a face view of a length of the metal ribbon as slit for use in the welding apparatus of FIG. 1 and in accordance with the invention;

FIG. 3 is a side view of a length of tubing comprising a series of partially slit tube sections and indicating also at the right hand end of the figure one of the tube sections after it has been completely severed from the preceding series; and FIGS. 4 and 5 are views of alternative forms of partially slit tubing made in accordance with the invention.

Referring to FIG. 1 of the drawings in further detail, there is here shown a length of the previously slit metal ribbon as at 10 being wound into helical convolutions as at 10a, 10b thereby forming tubing constituting a succession of partially cut-off sections each being largely separated from the preceding section by one of the diagonally positioned slits above referred to and as indicated at 11, 12 and 13 etc. The convolutions are joined together by a helically welded seam as indicated at 14 formed by the methods and apparatus such as disclosed in the above mentioned patent or if desired by use of the helical seam welding apparatus of an improved type disclosed and claimed in the U.S. patent application of Jack Morris Serial Number 811,214, filed May 5, 1959. In either case electrodes as at 15, 16 respectively are applied to the approaching trailing and leading edges of the strip shortly in advance of the weld point $w$, these electrodes being respectively connected to the terminals of a high frequency source of current for example of a frequency of from 50,000 to 100,000 cycles per second, or preferably higher. Since the welding method and apparatus per se does not constitute the present invention reference is made to the above mentioned U.S. patent and pending application for further details as to the preferred constructions and operation thereof.

As shown in FIGS. 1 and 2, slits 11, 12 and 13 formed in the ribbon prior to its entering the welding apparatus, are all positioned at an angle to the edge of the ribbon equal to the helix angle formed during the winding of the strip to shape the finished tubing. For clearness each of the slits as illustrated is shown as having substantial width, but it will be understood that in actual practice the slits may be so narrow that the metal on opposite sides of the slit will substantially touch.

Preferably as shown in FIG. 2 each slit stops short at its respective ends from intersecting the opposite edges 18 and 19 of the ribbon, that is, at the ends of each slit there are narrow unslit portions as at 20, 21 so that when the ribbon edges become welded together these unslit portions will together form unslit or small interconnecting portions as at 22 (FIG. 1). Except for the portions such as at 22 the slits, it will be noted, will preferably, although not necessarily extend circumferentially entirely around the finished tubing and in a plane perpendicular to the axis of the tubing, despite the diagonal position of the slits on the incoming ribbon stock. And the welded seam 14 in each case will pass through each of the remaining connecting portions 22. Thus, the fact that the incoming ribbon stock has been previously diagonally slit will not interfere with the formation and welding of the helical welded seam. At a later point or station each of the remaining connecting portions 22 may be cut apart as indicated at 22a in FIG. 3, thereby forming for example as shown, a section of tubing which may be used for forming a can or the like having its wall areas constituted of one or more complete helical turns of the metal ribbon used.

In case it is desired to use sheet metal ribbon stock of a given width as per FIGS. 1 to 3 and utilizing the same helix angle but for forming tube sections embodying for example 1½ turns each of the ribbon stock, then the diagonal slits are formed in the ribbon with spaces therebetween equal to 1½ times tan $\theta \pi D$. The resulting succession of tube sections will then be as shown in FIG. 4 where the successive sections are largely separated as by slits 30, 31 and 32 for example, and the small interconnecting portions are indicated as at 33, 34 and 35. Alternate ones of these interconnecting portions it will be noted, will then be located at opposite sides of the tubing. Yet the welded seam as at 14' will pass through the middle of each of these small interconnecting portions.

The example shown in FIG. 5 is like that shown in FIG. 3 except that each tube section will be constituted of three full convolutions of the ribbon stock, this being accomplished by spacing the slits as at 37, 38 at distances equal to three times tan $\theta \pi D$. It will be readily understood that with other spacings of the diagonal slits, tube sections of various lengths may readily be formed and with the small interconnected portions located at predetermined successive points around the finished tubing. But usually it will be preferred to so space the slits that the interconnecting portions of the tube sections will be in alignment and that will occur if the spacings of the slits are integral multiples of tan $\theta \pi D$.

It will be found that the strip thickness and net lap after mashing may slightly effect the cut-off length and the disposition of the slits relatively to the tube axis, and also the desired parallelism of the unslit portion of the tube and the axis. These effects however if detrimental, can readily be corrected by minor adjustments by trial of the helix angle or the slit angle, or both.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In a method for forming a succession of attached end-to-end tube sections which are severed from each other by circumferential slits except for small interconnecting portions interrupting the slits, the tubing being formed by helically winding a metal ribbon into successive convolutions which are then joined at their edges by a helical welded seam; the step which comprises slitting the ribbon prior to such winding and welding, along spaced apart lines which are at an angle to the edges of the ribbon substantially equal to the helix angle of the convolutions, and the slits near each edge of the ribbon being interrupted before reaching the edges, whereby in the resulting succession of tube sections the said slits will then extend circumferentially in planes substantially perpendicular to the axis of the tubing, and the slits will be interrupted where the helically welded seam passes from one tube section to the next.

2. In a method for forming a succession of attached end-to-end tube sections which are severed from each other by generally circumferential slits except for small interconnecting portions interrupting the slits, the tubing being formed by helically winding a length of metal ribbon into successive convolutions which are then joined at their edges by a helical welded seam; the step which comprises slitting the ribbon between its ends prior to such winding and welding, along spaced apart parallel lines which are at a substantial angle to the edges of the ribbon, the slits near each edge of the ribbon being interrupted before reaching the edges, whereby in the resulting succession of tube sections the said slits will then extend generally circumferentially and the slits will be interrupted where the helical welded seam passes from one tube section to the next.

3. Method in accordance with the foregoing claim 2 and in which said slits are spaced apart by a distance which is an integral multiple of tan $\theta \pi D$, whereby said interconnecting portions become positioned in alignment along the succession of tube sections.

References Cited in the file of this patent

UNITED STATES PATENTS

| | | |
|---|---|---|
| 2,005,579 | Dudley | June 18, 1935 |
| 2,873,353 | Rudd | Feb. 10, 1959 |